Sept. 7, 1937. C. N. JACOBS 2,091,990
CUTTING AND ASSEMBLING MACHINE
Filed July 5, 1934 3 Sheets-Sheet 1

WITNESS:

INVENTOR
Clifton N. Jacobs
BY
Busser & Harding
ATTORNEYS.

Sept. 7, 1937.    C. N. JACOBS    2,091,990
CUTTING AND ASSEMBLING MACHINE
Filed July 5, 1934    3 Sheets-Sheet 2

WITNESS:
Robt R Mitchel.

INVENTOR
Clifton N. Jacobs
BY
Busser & Harding
ATTORNEYS

Sept. 7, 1937. C. N. JACOBS 2,091,990
CUTTING AND ASSEMBLING MACHINE
Filed July 5, 1934 3 Sheets-Sheet 3
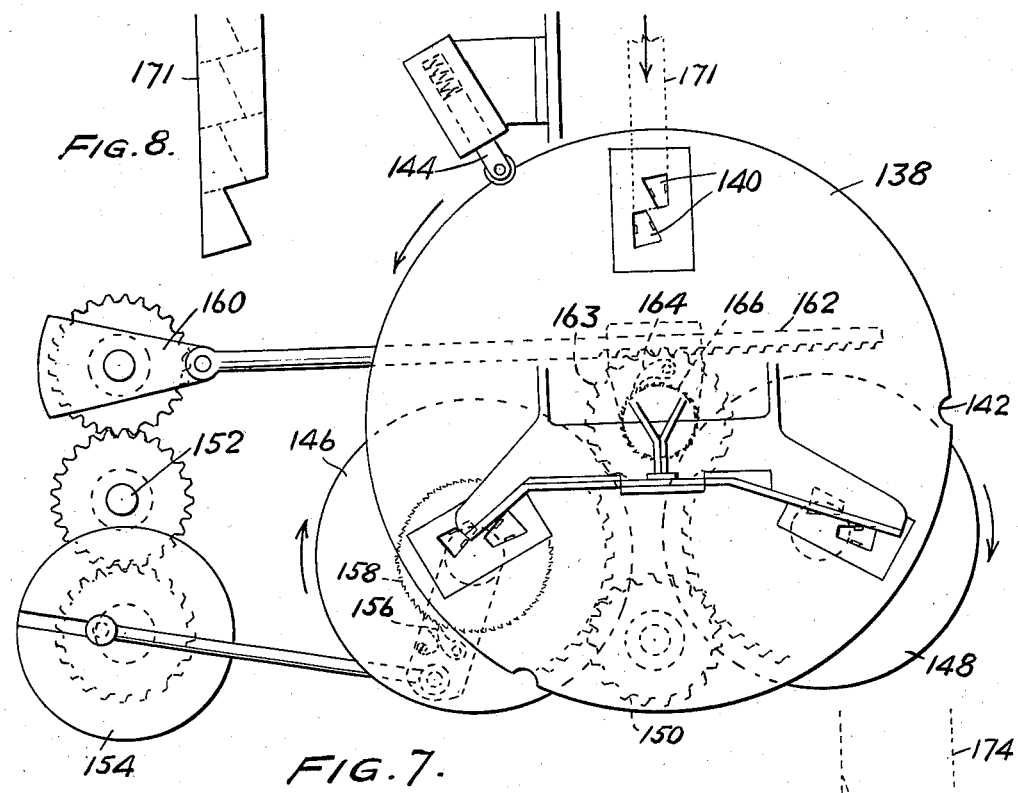
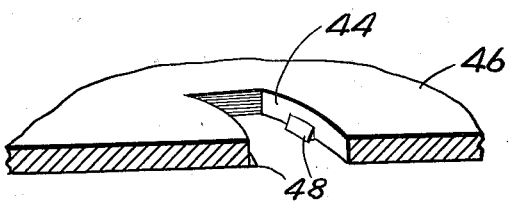
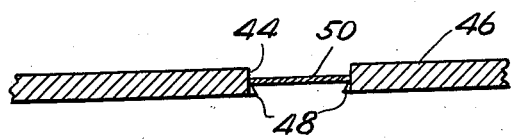
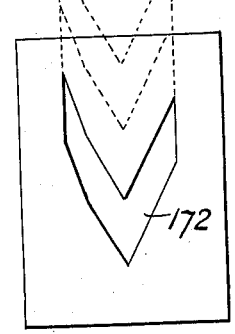
INVENTOR
Clifton N. Jacobs
BY
Busser & Harding
ATTORNEYS
WITNESS:
Robt R Mitchel Patented Sept. 7, 1937

2,091,990

UNITED STATES PATENT OFFICE 2,091,990

CUTTING AND ASSEMBLING MACHINE

Clifton N. Jacobs, Norristown, Pa., assignor, by mesne assignments, to Taylor Fibre Company, Norristown, Pa., a corporation of Pennsylvania Application July 5, 1934, Serial No. 733,745

10 Claims. (Cl. 154—1)

This invention relates to a cutting and assembling machine particularly designed for the production and assembly of pieces of impregnated fabric designed to be compressed into gear or pulley blanks.

In my application Ser. No. 698,560, filed November 18, 1933, there is described a non-metallic gear, pulley or the like formed by compression of fabric impregnated with a binder. The gear or pulley is formed by compression in a heated mold of properly assembled pieces of fibrous textile fabric such as duck, convas, or the like, impregnated with a binder, for example, a thermoplastic resin or a thermosetting resin, for example, a phenol-formaldehyde resin, which will flow and take form and become insoluble and infusible under the action of heat and pressure. The metallic gear or pulley may be formed entirely of this impregnated fabric, or may include a metallic hub. The application just referred to relates to a gear or pulley or the like made by means of a particularly advantageous assembly of impregnated fabric pieces. Specifically in accordance with said invention, separate fabric pieces make up the rim and intermediate portions of the blanks.

It is the object of the present invention to provide a mechanism which automatically cuts and assembles the pieces of impregnated fabric into a mold in which they are to be compressed.

Specific objects relating particularly to details of the invention will be apparent from the following description read in conjunction with the accompanying drawings, in which:

Fig. 5 is a perspective sectional view showing a portion of the turret for carrying the fabric pieces;

Fig. 6 is a sectional view of the same showing a piece held therein;

Fig. 7 is a diagrammatic plan view showing the modified arrangement of a machine for assembling certain parts entering into the formation of the blank;

Fig. 8 is a view showing the fabric strip which is cut as indicated; and

Fig. 9 shows a modified form of die and, diagrammatically, the type of cutting effected thereby.

Figures 1, 2:
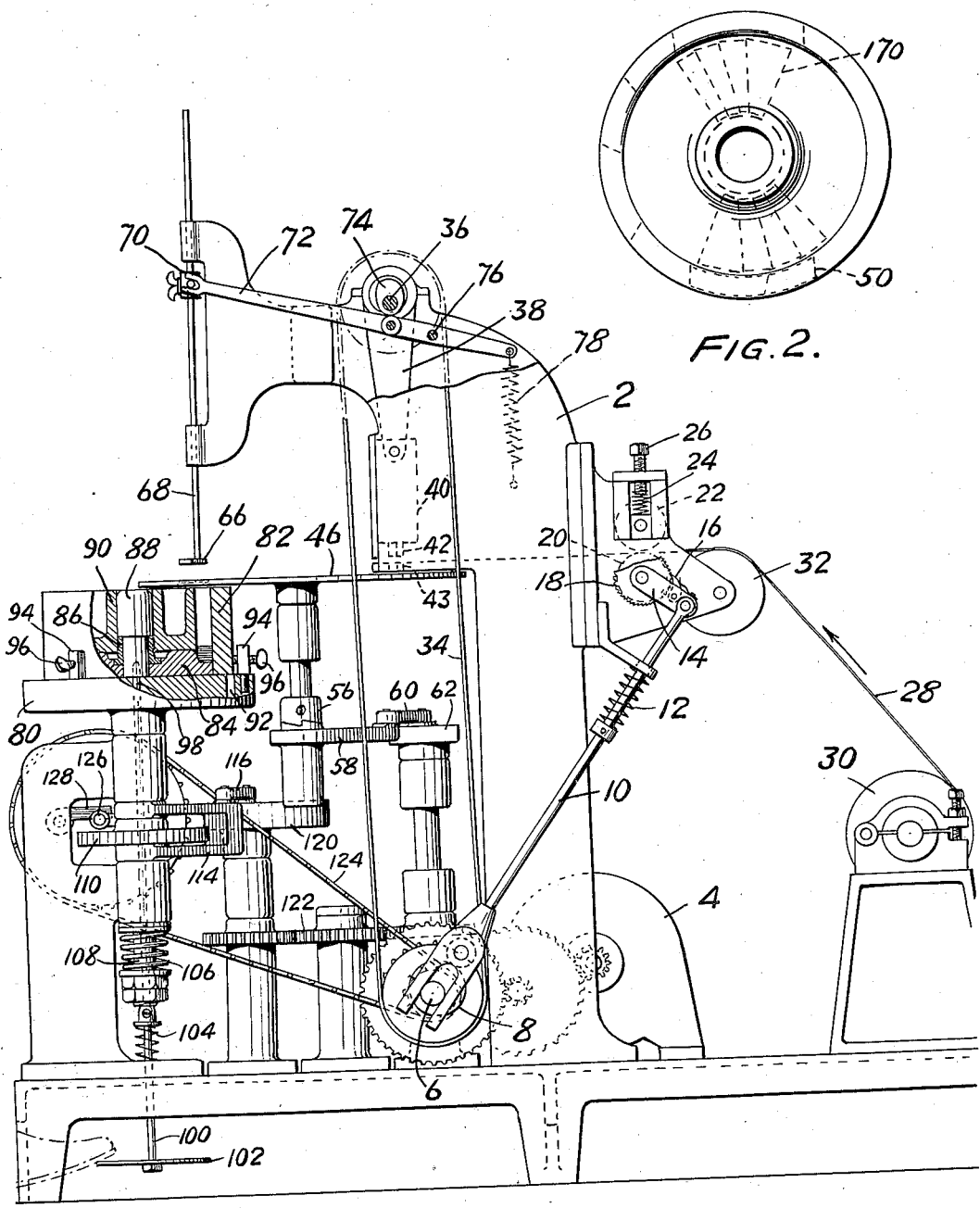
Fig. 1 is a side elevation of a preferred form of a mechanism in accordance with the invention, certain of the parts being shown in section to better illustrate details of construction.
Fig. 2 is a plan view of a finished blank made by the machine having indicated in dotted lines the relationships of the various elements involved in the assembly.

The machine comprises a frame 2 which supports the various operating parts including a motor 4 which supplies the power for driving all of the mechanism. The motor 4 drives, through suitable reduction gearing, a main shaft 6 through which motions are transmitted to the various parts.

The shaft 6 carries a cam 8 which acts upon a roller mounted on a push-rod 10 which is urged downwardly by the action of a spring 12 and is pivoted at its upper end to an arm 14 which carries a pawl 16 spring-pressed into engagement with the teeth of a ratchet wheel 18. The ratchet wheel 18 is connected to the shaft of a lower roller 20 towards which there is pressed a cooperating upper roller 22 by means of springs 24 whose tensions are adjustable by screws 26. The impregnated fabric from which the pieces are to be cut is indicated at 28 and passes from a supply reel 30 over a guiding roller 32 and thence between the feeding rollers 20 and 22. By reason of the pressure exerted by the springs 24, a positive drive of the material is effected so that upon each stroke of the push-rod 10 corresponding to a rotation of the main shaft 6, a definite feed is imparted to the fabric strip.

Figure 3:
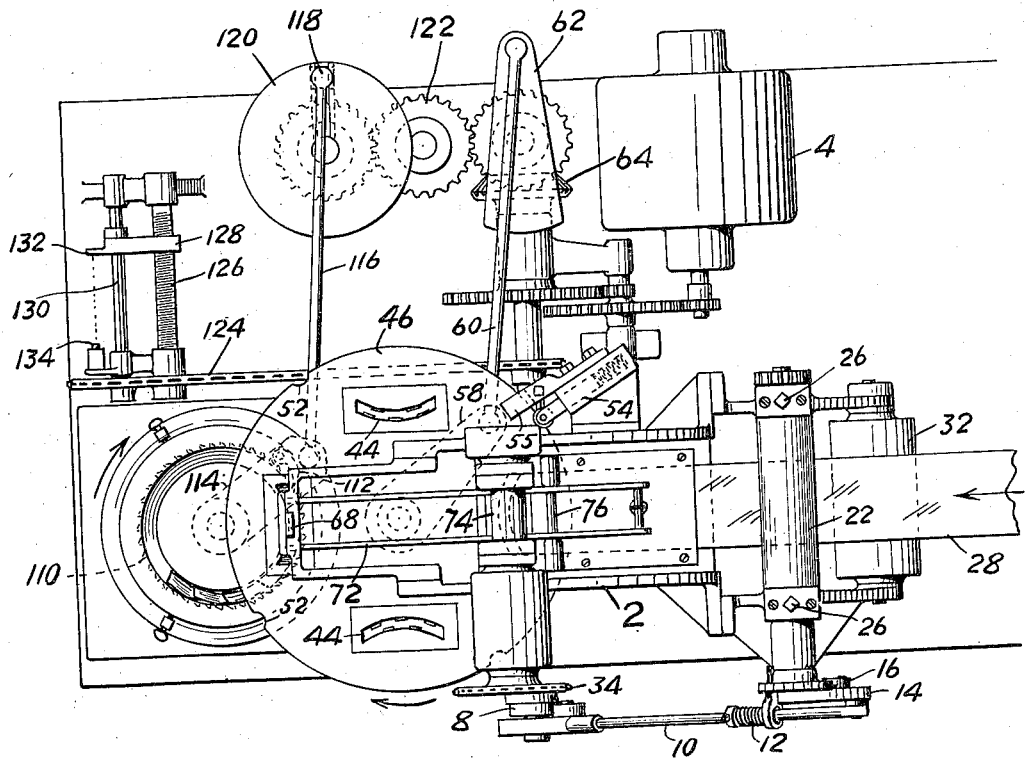
Fig. 3 is a plan view of the machine.

Driven from the main shaft 6 by a chain 34 trained over suitable sprockets is a transverse upper shaft 36. This shaft carries an eccentric surrounded by a strap 38 which is pivoted to the vertically moving guided cross-head 40, which at its lower end is provided with a suitable punch 42 arranged to enter a die 43 formed in a plate over which the fabric strip 28 passes. Upon each reciprocation of the punch 42, a section of the fabric is cut from the strip and forced into one of the openings 44 of corresponding shape formed in inserts in a turret 46. The openings 44 are of the same form as the die openings 43. The punch 42 has a downward stroke of such extent as to force the cut piece into an opening 44 to a position where it is held by the series of inward projections 48 provided in each turret opening. These projections 48 insure that the cut sections are not dropped by the turret until they are forcibly ejected by a subsequent event in the operation of the machine. The machine illustrated in Figs. 1 and 3 is adapted to cut the sections for the formation of the rim portion of the blank. These sections have a shape such as indicated by the openings 44 in Fig. 3. These rim sections are designated 50.

The turret 46 has imparted thereto a quarter revolution in each revolution of the main shaft 6. To maintain it in proper position at the end of each quarter revolution, its periphery is provided with depressions 52 adapted to receive a spring-pressed roller 54 which acts as a yielding detent holding the turret in its proper position except when it is forcibly turned by the advancing mechanism. A friction pad 55 prevents overrun of the turret.

The advancing mechanism comprises a clutch member 56 having four teeth cooperating with a clutch member 58 which also has four teeth, there being between the turret and the first clutch member a splined connection, the clutch member being urged downwardly by a suitable spring, not shown. A link 60 is pivoted to a lateral extension of the lower clutch member and is connected to a crank 62 mounted on a vertical shaft which is driven at a one to one ratio through bevel gears 64 from the main shaft 6. The arrangement is such that upon each revolution of the crank 62 a quarter revolution of the turret occurs, the turret being brought to rest at the end of the quarter revolution by the detent 54. At each of such times one of the openings 44 is located immediately beneath the die opening 43.

Since the turret is provided with four openings 44 equally spaced, whenever it is brought to rest an opening 44 will be located diametrically opposite the one which is in alignment with the die 43. Arranged immediately above this last opening, there is a plunger member 66 having the general shape of the openings 44 but of smaller size and adapted to force downwardly out of an opening 44 the piece of impregnated fabric carried thereby. The member 66 is carried by a rod 68 mounted for vertical reciprocation in the frame on which is located a cross-head 70 which has a strong frictional engagement with the rod 68. This cross-head 70 is provided with pins engaged by the bifurcated ends of a double lever 72 which is rocked about its pivot 76 by the action of a cam 74 on the shaft 36 against the action of a spring 78. By reason of the frictional engagement between the cross-head 70 and the rod 68, if the downward movement of the rod 68 is definitely arrested, the cross-head may slide relatively to the rod. As a result allowance is made for the accumulation of fabric pieces in the mold as will be more evident hereafter.

A plate 80 is provided for the reception of the parts constituting the mold in which the blank is formed by compression of assembled fabric elements. This mold comprises an annular outer member 82 and a bottom member 84. If the blank is to be provided with a metallic hub liner, this liner is located within the mold as indicated at 86. The liner is in the form of a sleeve the outer surface of which is roughened so that it will bind more securely with the fibrous portions of the blank. A pin member, indicated at 88 and of the form shown, forms a central lining element for the mold insuring, as will be clear hereafter, the proper location of the intermediate fabric elements.

The peripheral fabric elements are first located in the mold. To insure that they take their proper positions, the central part of the mold is provided with a filler indicated at 90 which leaves only a limited annular space for the reception of the elements 50, this annular space having a thickness approximately corresponding to the rim width of the finished blank. The mold parts are centrally located by the use of elements 94 receivable within openings 92 in the plate 80 and provided with adjusting screws 96 adapted to engage and centrally locate the mold. Various openings may be provided in accordance with the predetermined pattern so that molds of different sizes may be accommodated. Suitable adjustment is also made of the head of the machine carrying the push-rod 66.

To insure the central location of the mold, there is provided a pin 98 which extends through the shaft 108 secured to the plate 80 and is urged upwardly by a spring 104 acting upon a collar carried by the pin. A lower extension 100 of the pin carries a disc 102 which may be engaged by the foot of the operator to bring the pin below the top surface of the plate 80 so as to withdraw it from the opening in the pin member 88. By reason of this arrangement, the operator may slide the assembled mold parts about the plate 80 until the alignment of the pin 98 with the opening in the pin 88 is felt. The pin 98 may then be released for upward movement and will thereafter maintain the mold centrally located with respect to the axis of the table 80. To maintain the parts tight and impart sufficient friction to prevent overrun, a spring 106 urges the shaft 108 downwardly to cause the hub of the plate 80 to tightly engage its bearing. Secured to the shaft 108 is a ratchet 110 which is adapted to be engaged by a pawl 112 pivoted upon an arm 114 to which rocking movements are imparted by a link 116 connected at 118 to a radially adjustable block carried suitably by a disc 120 which is driven through gearing 122 from the vertical shaft to which reference has heretofore been made. By adjustment of the throw of the link 116 the amount of movement imparted to the mold upon each revolution of the main shaft may be adjusted. The movement is preferably such that the successive fabric elements located in the mold overlap to some extent as indicated in Fig. 3 and as more fully described in my prior application.

To insure operation without constant supervision by an attendant, there is provided a means for automatically stopping the machine after a predetermined number of fabric elements have been delivered to the mold. This includes a mechanism driven through a chain 124 from the main shaft, the mechanism including a rotatable screw 126 with which there engages a half-nut 128 guided for sliding movement in the direction of the axis of the screw by a fixed rod 130. An extension of this half-nut indicated at 132 is adapted to engage a switch button 134 arranged to break the circuit through the motor 4 and thus stop the operation. By the initial location of the half-nut 128 at a proper position along the screw 126, the half-nut will be moved slowly towards the button 134, engaging it and stopping the machine after a predetermined number of revolutions of the screw 126 corresponding to the delivery of a predetermined number of fabric elements to the mold.

In the operation of the machine heretofore described, the elements are cut from the strip 28 located within the openings of the turret 46. At the end of the second subsequent movement of the turret each cut element is located in a position above the annular portion of the mold between the rim 82 and the filler 90 and beneath the plunger 66. In the next operation of the machine, the element is forced downwardly into the mold by the action of the plunger. As the elements accumulate in the mold, yielding occurs at 70 so that while the elements are forcibly located in position, there is no danger of breakage or of the application of excessive pressure which might result in a premature assembly of the elements due to the flowing of the thermoplastic binder. Following the location of each of the elements in position, a rotational movement is imparted to the mold producing the offset of the elements referred to above.

Figure 4:
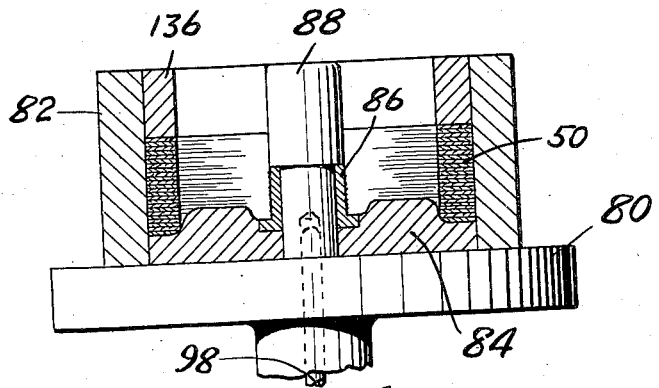
Fig. 4 is a vertical section through the mold illustrating its component parts.

After sufficient of the elements have been located within the mold and the machine has been brought to rest, the mold is removed and ring 136 is located upon the pile of assembled elements and the central filler 90 taken out. At this stage the mold will be in the condition illustrated in Fig. 4, ready for the reception of the elements which are adapted to form the portion of the blank between the hub and the rim.

To accomplish the assembly of the intermediate elements there is utilized a machine which is almost identical with the one heretofore described except in the arrangement of the turret and the fact that there are provided duplicate mold receiving tables. This mechanism is illustrated in Fig. 7, in which there are not duplicated those elements which are common to both of the cutting and assembling devices. A turret 138 is provided in this last machine which carries inserts having openings 140 therein shaped to conform with the elements which, by assembly, form the intermediate portions of the blanks. An advantageous arrangement involves the provision of two of these openings which receive pieces from the strip of material simultaneously in a single cutting action of a punch member. By the arrangement of the openings as illustrated in Fig. 7, there is no waste of material, cuts of the strip 171 being made as shown in Fig. 8. It will be obvious that the edges resulting from one cutting line up with the edges resulting from a subsequent cutting to insure a complete use of the strip. Instead of having a quarter revolution imparted to it in each operation of the machine, the turret 138 has a third of a revolution. It is brought to rest in proper positions by the action of a spring-pressed detent 44 which enters shallow depressions 142 in the periphery of the turret.

Two mold receiving plates 146 and 148 are provided corresponding to the single plate 80 of the previous modification. On these plates, the molds are located in the same fashion as heretofore described. For clarity, the molds are omitted from Fig. 7. The two plates 146 and 148 are geared to rotate together but in opposite directions by the provision of an intermediate idler 150 meshing with gears carried by the two plates. On the shaft of the plate 146 there is provided a ratchet 158 arranged to be engaged by a pawl 156 carried by an arm which is reciprocated through a link secured to a radially adjustable crank pin in a crank disc 154. The disc is driven by suitable gearing from a vertical shaft 152 which is driven from a main shaft corresponding to 6 of the modification of Figs. 1 and 2. The shaft 152 also drives a crank 160 to which is secured a rack 162 meshing with a pinion 163 and held in proper mesh by means of a guiding sleeve member pivoted concentrically with the pinion 163. The pinion 163 is journalled upon the shaft of the turret 138 and carries a pawl 164 which meshes with a ratchet 166 secured to the turret. By reason of the connections just described, it will be seen that during the operation of the machine 120 degree rotational steps are imparted to the turret 138 and at the same time the molds are stepped about by the action of the crank disc 154. These movements are such as to again produce an overlapping arrangement of the impregnated fabric elements. Pushers corresponding to 66 are provided in duplicate in this form of the machine and are adapted to press from the openings 140 the fabric elements into the intermediate portions of the molds. It may be pointed out that the two machines correspond in such fashion that approximately twice the number of intermediate elements are required in each mold as compared with the number of rim elements. Consequently, two molds may be filled with rim elements in about the same time as one mold is filled with intermediate elements, which are designated 170 in Fig. 2. By the duplication occurring in the machine of Fig. 5, an efficient type of over-all operation of the machinery is provided.

It will be obvious from Fig. 5 that the intermediate fabric elements 170 carried by the innermost of the openings 140 will be located in the mold supported upon the plate 146, while those which are carried in the outer opening 140 will enter the mold carried by the plate 148. This ties up with the arrangement of the openings which provides a complete use of the strip material without waste.

It will be clear that various changes may be made in the specific embodiment of the invention without departing from the spirit thereof as defined in the following claims.

Instead of forming the rim and hub of separate pieces, single pieces may serve, these pieces being as indicated at 174 and formed by a die such as 172. Such pieces may be assembled in a mechanism similar to that already described, the pieces being overlapped as shown in the application of John M. Taylor, Ser. No. 700,542, filed Dec. 1, 1933, which issued November 24, 1936, as Patent 2,061,815.

What I claim and desire to protect by Letters Patent is:

1. Means for assembling pieces of sheet material in a mold including means for intermittently feeding a web of said material, means for cutting pieces from said web, means for receiving the cut pieces and locating them adjacent the mold, means for removing the cut pieces from the last named means and entering them within the mold, and means for intermittently moving the mold and said means for receiving the cut pieces whereby the pieces are located in overlapping relationship therein.

2. Means for assembling pieces of sheet material in a mold including means for intermittently feeding a web of said material, means for cutting pieces from said web and suitably movable means for receiving the cut pieces and locating them adjacent the mold, reciprocating means for removing cut pieces from said receiving means and bottoming the cut pieces within the mold, and means for intermittently moving the mold whereby the pieces are located in overlapping relationship therein.

3. Means for assembling pieces of sheet material in a mold including means for cutting the pieces from a web, means for transporting the pieces from the locus of the cutting means to a position adjacent the mold, and means for entering them within the mold.

4. Means for assembling pieces of sheet material in a mold including means for transporting the pieces to a position adjacent the mold, and means for removing the pieces from the last named means and entering them within the mold.

5. Means for assembling pieces of sheet material in a mold including means for transporting the pieces to a position adjacent the mold, means for removing the pieces from the last named means and entering them within the mold, and means for intermittently moving the mold in timed relation with said transporting means whereby the pieces are located in overlapping relationship therein.

6. Means for assembling pieces of sheet material in a mold including a rotating turret provided with openings in which the pieces are removably held, and means for forcibly removing the pieces from the turret and locating them within the mold.

7. Means for assembling pieces of sheet material in a mold including means for intermittently feeding a web of said material, means for cutting pieces of predetermined shape from said web, a rotatable member provided with an aperture of the shape of said pieces, said member being arranged with relation to said cutting means to receive pieces in said aperture, means for retaining pieces within the aperture in said rotatable member and means for rotating said rotatable member to position the aperture therein adjacent to the cutting means for the reception of pieces and to position the aperture therein adjacent to the mold and means for removing pieces from said aperture and entering them in the mold.

8. Means for assembling pieces of sheet material in a mold including means for intermittently feeding a web of said material, means for cutting pieces from said web, means for receiving the cut pieces and locating them adjacent the mold, frictionally controlled means for removing the cut pieces from the last named means and entering them within said mold, and means for intermittently moving the mold whereby the pieces are located in overlapping relationship therein.

9. Means for assembling pieces of sheet material in a mold including means for cutting the pieces from a web, means for transporting the pieces to a position adjacent the mold, and frictionally controlled means for entering them within the mold.

10. Means for assembling pieces of sheet material in a mold including means for intermittently feeding a web of said material, means for cutting pieces from said web, means for receiving cut pieces and locating them adjacent the mold, means for removing the cut pieces from the last named means and entering them within the mold, and means for intermittently rotating the mold and the said means for receiving cut pieces whereby the pieces are located in overlapping relationship in the mold.

CLIFTON N. JACOBS.